June 26, 1951  J. H. KNAPP  2,558,522
HOT DRINK MAKER AND VENDING MACHINE
Filed Feb. 28, 1945  9 Sheets-Sheet 1

INVENTOR.
Joseph H. Knapp
BY
ATTORNEY.

INVENTOR.
Joseph H. Knapp
BY
ATTORNEY.

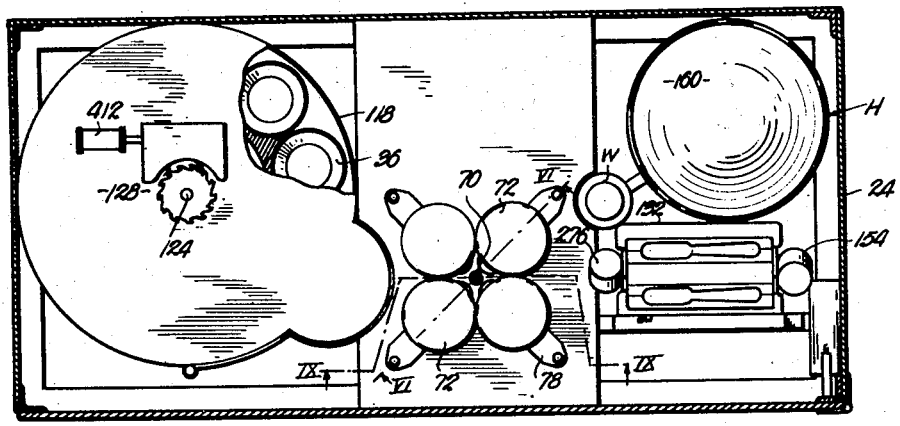
Fig. 4.
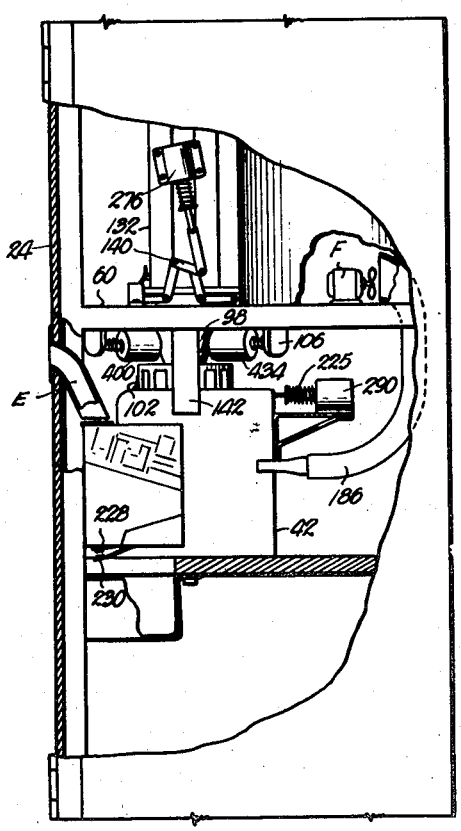
Fig. 5.
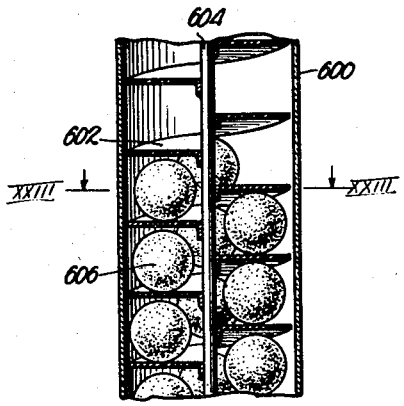
Fig. 22.
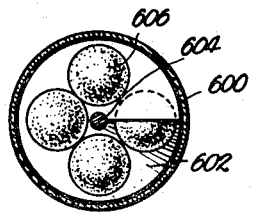
Fig. 23.
INVENTOR.
Joseph H. Knapp
BY
ATTORNEY.

June 26, 1951 J. H. KNAPP 2,558,522
HOT DRINK MAKER AND VENDING MACHINE
Filed Feb. 28, 1945 9 Sheets-Sheet 4
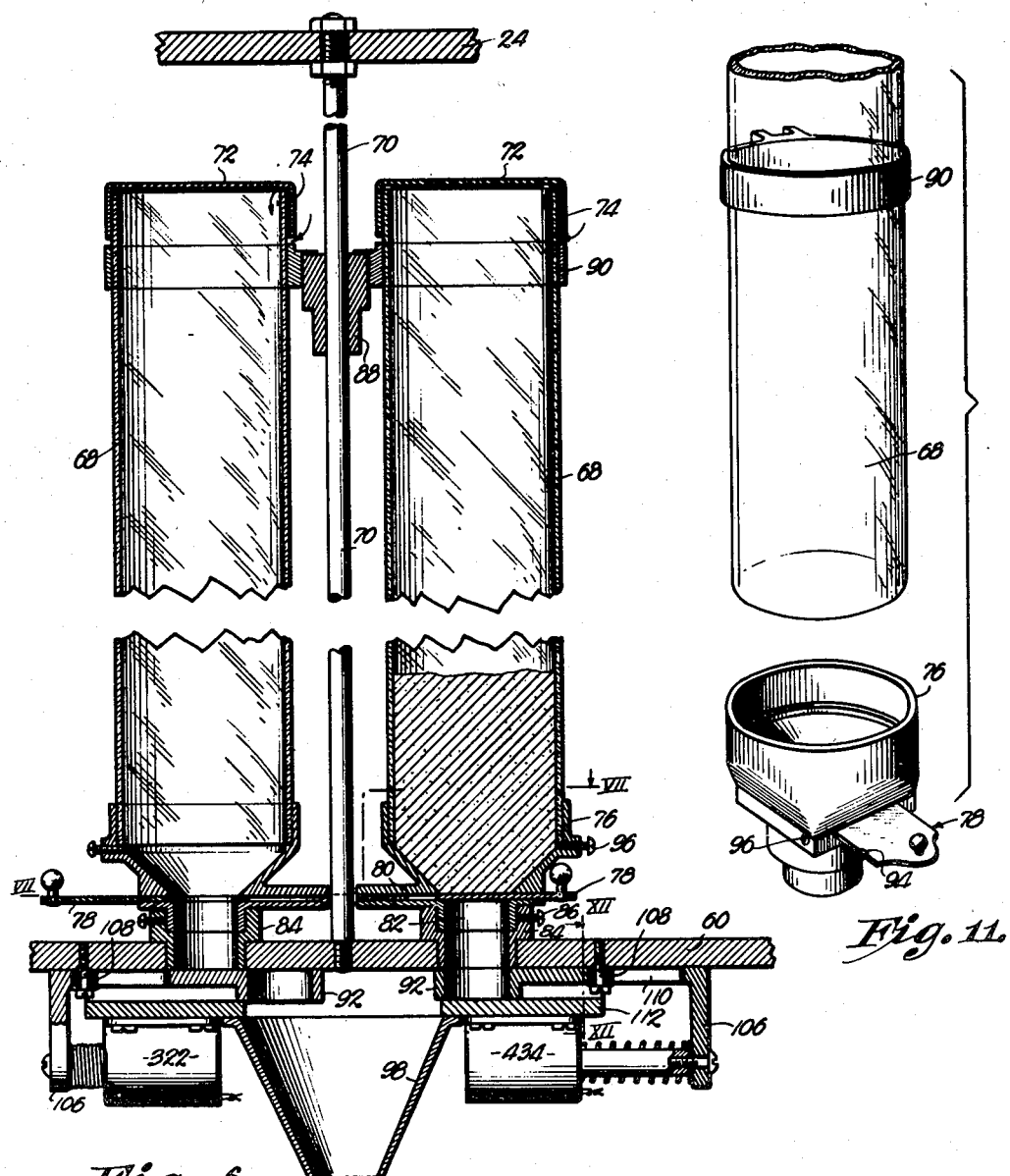
Fig. 6.
Fig. 11.
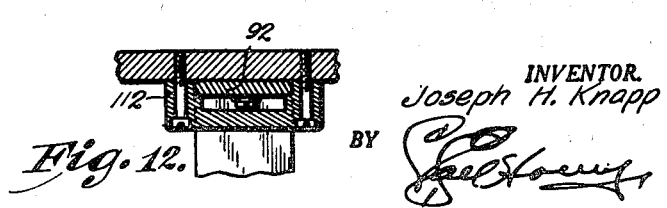
Fig. 12.
INVENTOR.
Joseph H. Knapp
BY
ATTORNEY.

June 26, 1951  J. H. KNAPP  2,558,522
HOT DRINK MAKER AND VENDING MACHINE
Filed Feb. 28, 1945                                9 Sheets-Sheet 5

INVENTOR.
Joseph H. Knapp
BY
ATTORNEY.

June 26, 1951  J. H. KNAPP  2,558,522
HOT DRINK MAKER AND VENDING MACHINE
Filed Feb. 28, 1945  9 Sheets-Sheet 7
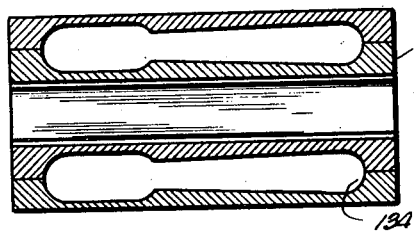
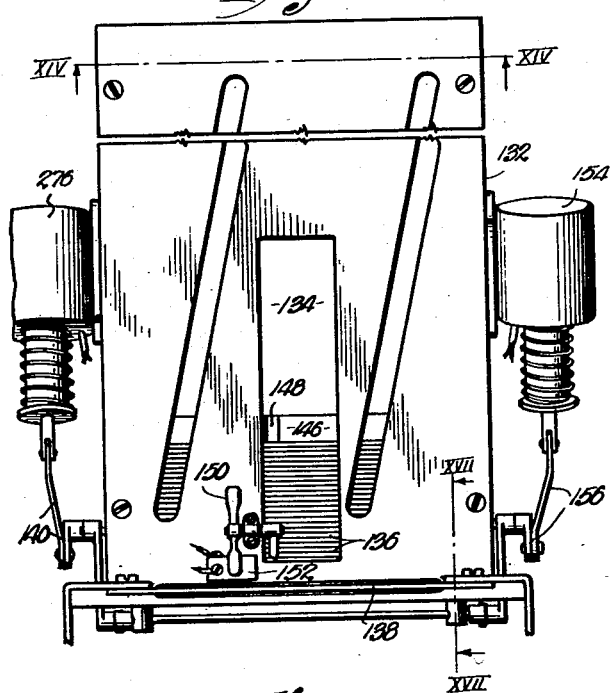
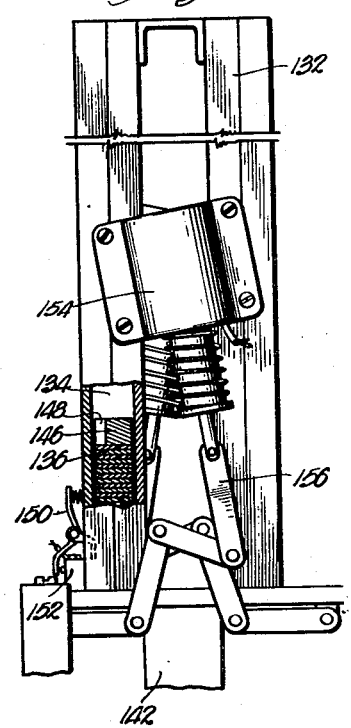
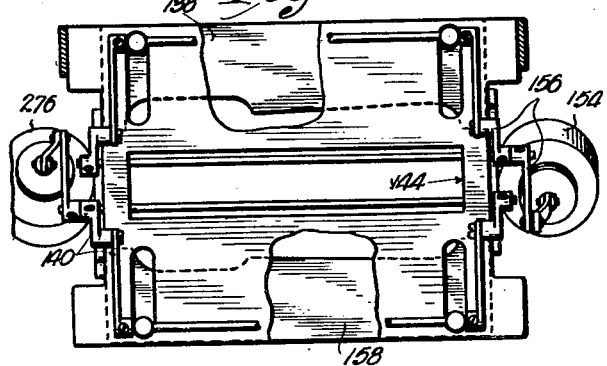
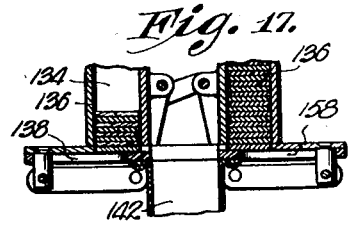
INVENTOR.
Joseph H. Knapp
BY
ATTORNEY.

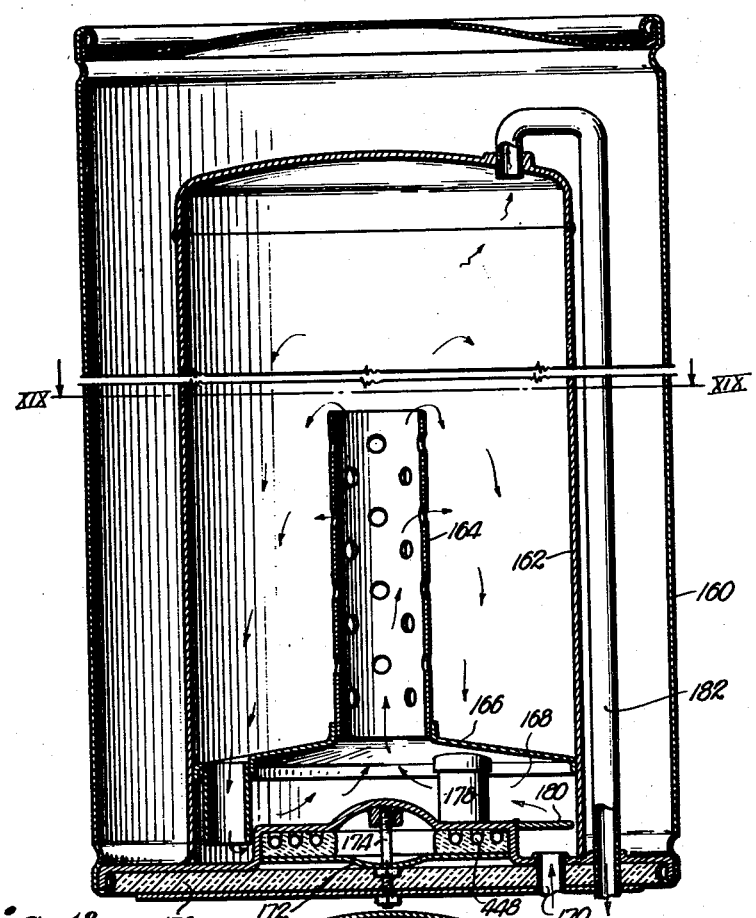
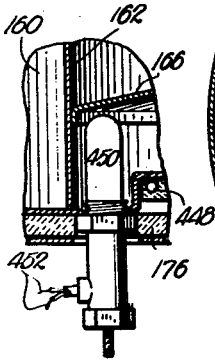
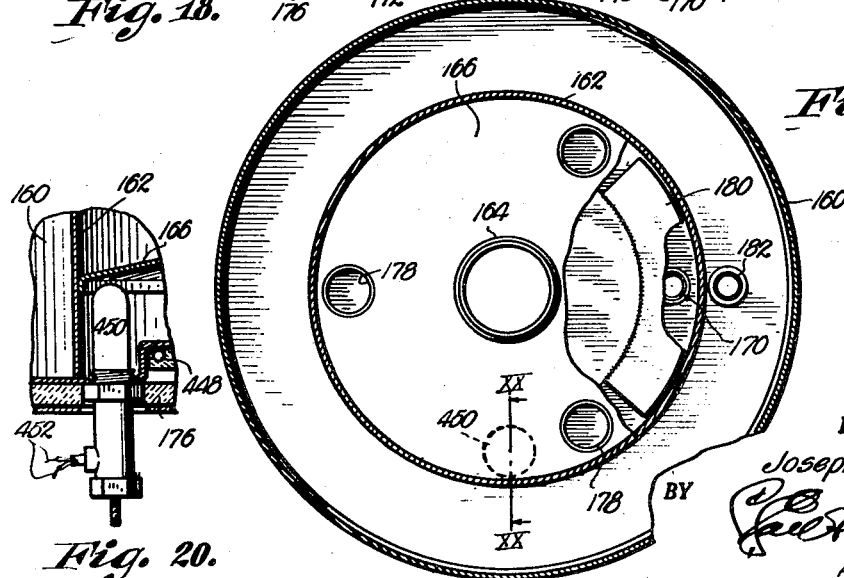

INVENTOR.
Joseph H. Knapp
BY
ATTORNEY.

Patented June 26, 1951

2,558,522

UNITED STATES PATENT OFFICE 2,558,522

HOT DRINK MAKER AND VENDING MACHINE

Joseph H. Knapp, Kansas City, Mo., assignor, by direct and mesne assignments, to C. Earl Hovey, Kansas City, Mo., as trustee Application February 28, 1945, Serial No. 580,253

4 Claims. (Cl. 225—21)

This invention relates to the art of preparing hot drinks from two or more component ingredients, and has for its primary aim the provision of a decocting machine operable automatically from the time a switch is closed, either manually or through the dropping of a coin, token or the like.

One of the primary objects of this invention is to provide a hot drink maker and vending machine whereby drinks having various selected chacteristics may be produced at the whim and desire of the operator, such drinks being made through a sequence of steps that continuously occur after the equipment has been set to establish the type of drink and a starting mechanism has been actuated.

A still further and important object of this invention is to provide a drink making machine having the aforementioned characteristics and wherein is included novel, unique, efficient and relatively inexpensive mechanism and apparatus for automatically producing the drink after the machine has been put into operation.

Further and more specific objects of the instant invention are to provide a decocting machine for drinks such as hot coffee, hot chocolate, hot bouillon or other liquid foods produced by infusion, which machine is capable of performing a series of successive steps in a given cycle without attention of the customer or operator other than to pre-select the nature of the drink desired.

The machine embodying the invention is further capable of continuous automatic operation after being set into motion to complete the steps of (a) depositing a container in the decoction chamber; (b) introducing a stirring implement into the container; (c) depositing one or more ingredients into the container; (d) supplying liquid of a predetermined temperature, capable of dissolving the ingredients in the container; (e) ventilating the decoction chamber simultaneously as a compartment within the machine is evacuated of air; and (f) discontinuing the ventilating equipment upon removal of the container from within the decoction chamber.

Other objects of the invention include specific details of construction, all of which contribute to the production of a compact, commercially practicable vending machine. These objects of a relatively minor nature, also are to provide electrical apparatus that combines with the mechanical features of the equipment in an unique way—all of which will appear during the course of the following specification, referring to the accompanying drawings wherein:

Fig. 4 is a transverse cross sectional view taken on line IV—IV of Fig. 3, and looking in the direction of the arrow.

Fig. 5 is a fragmentary side elevational view with a part of the wall broken away to reveal parts within the case.

Fig. 6 is a fragmentary enlarged sectional view taken on line VI—VI of Fig. 4.

Fig. 11 is a perspective view of one of the ingredient reservoirs entirely removed from association with the remaining portion of the machine and illustrating the manner in which the actual container for the ingredient is constructed and assembled with that part having the outlet port formed therein.

Fig. 12 is a fragmentary sectional view taken on line XII—XII of Fig. 6.

Fig. 13 is a condensed side elevational view of the stirring implement feeding mechanism and magazine therefor.

Fig. 14 is a cross sectional view taken on line XIV—XIV of Fig. 13.

Fig. 15 is an inverted lower end view of the stirring implement magazine shown in Fig. 13.

Fig. 16 is a fragmentary side elevational view of the implement feeding mechanism.

Fig. 17 is a fragmentary sectional view taken on line XVII—XVII of Fig. 13.

Fig. 18 is an enlarged vertical central sectional view through the liquid boiler.

Fig. 19 is a cross sectional view taken on line XIX—XIX of Fig. 18.

Fig. 20 is a fragmentary sectional view taken on line XX—XX of Fig. 19.

Fig. 22 is a fragmentary longitudinal sectional view through one of the ingredient reservoirs, illustrating the manner of supporting the ingredient units therein; and Fig. 23 is a cross sectional view taken on line XXIIII—XXIII of Fig. 22.

Figure 1:
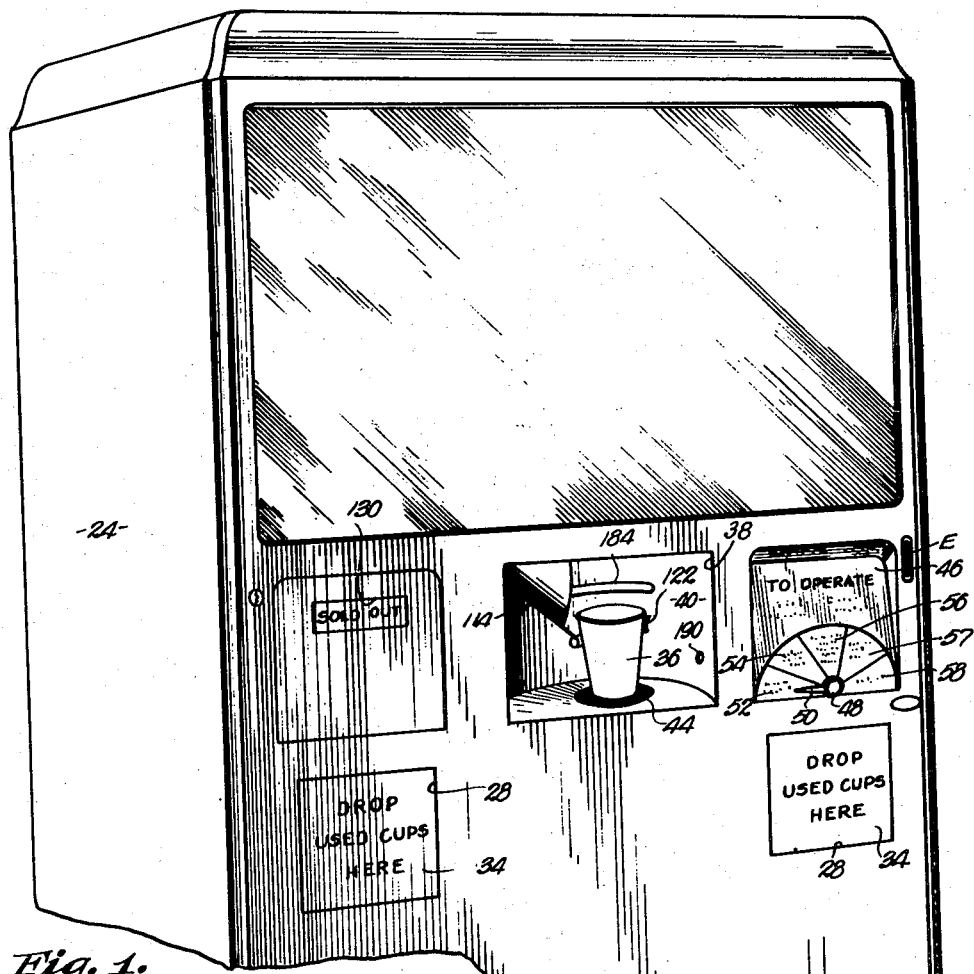
Fig. 1 is a perspective view of a hot drink maker and vending machine embodying the present invention.
Figure 2:
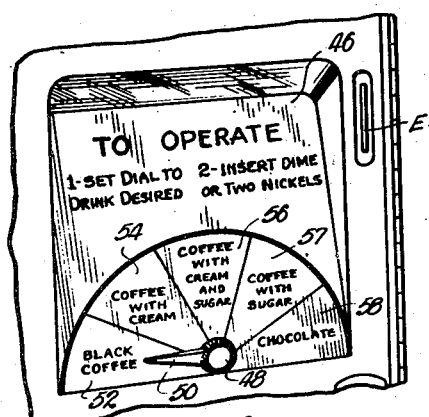
Fig. 2 is a fragmentary elevational view of a portion of the cabinet, illustrating the means for selecting the type of drink to be made.

Case 24 within which is housed the operating parts of the machine made to embody the present invention may assume the contour and appearance of that illustrated in Fig. 1. Since the equipment is usable in locations having widely varying characteristics, it is obvious that a case 24 should be constructed to meet point of location conditions.

The interior of the case is made accessible through door 26 constituting substantially the entire front wall and through which is formed openings 28 affording access to space 30 within the case 24 below transverse partition 32.

Swinging doors 34 closing each opening 28 respectively, bear the notation "Drop used containers here" and when the machine is on location where the public becomes the operator thereof, the used containers or paper container 36 may be depoisted in space 30 through these openings 28. Another opening 38 formed through door 26 permits free access to the decoction chamber 40 established by a housing 42 that rests upon partition 32.

That portion of partition 32 defining the floor of decoction chamber 40 is dished and equipped with a foraminous area 44 through which any liquid may pass into space 30 in the event container 36 overflows or if some of the ingredients drop from the outlet ports, hereinafter to be more fully described.

The entire panel 46 carried by door 26 supports a manually manipulable knob 48 and a pointer 50. The latter sweeps over a number of well defined areas of panel 46 within which is contained matter descriptive of the character of drink which will be produced by the machine when the pointer rests in a given position. Area 52 has the notation "Black coffee" thereon; area 54 carries the notation "Coffee with cream" area 56 has the wording "Coffee with cream and sugar"; area 57 has the notation "Coffee with sugar" thereon; and area 58 has the indicia "Hot chocolate." Directions for operating the machine are also found on panel 46 which is adjacent to the open end of coin chute E.

Knob 48 carries the hereinafter more fully described contact plates 200 and 202, and as the knob is turned these plates will be likewise shifted to cause the selected drink to be produced after a coin is introduced through chute E.

The mechanism and apparatus within case 24 is rigidly mounted in place either upon the frame of the case 24, the horizontal partition 32, or partition 60. The interior of case 24 may be further partitioned to segregate several ingredient reservoirs 68 from other parts, if desired. These reservoirs 68 are of similar character and the same are clustered around a support rod 70 extending from partition 60 to the top of case 24.

Reservoirs 68 are preferably tubular in form and constructed of glass, plastic or some substance that will be sanitary and capable of being sterilized when refilling is necessary.

A cap 72 closes the upper end of each reservoir 68 and a vent 74 insures the introduction of air into the reservoir 68, and therefore, the flow of the ingredient therefrom. The lower ends of reservoirs 68 nest into a head 76 provided with a slide 78 with a perforation 80 therethrough that may be shifted to and from a location in registed with outlet port 82. For convenience in loading, head 76 is attached to the lower end of reservoir 68 and slide 78 is closed to confine the ingredients within reservoir 68. A collar 84 telescopically receives a part of head 76 and after the reservoir 68 is poistioned as shown to the right in Fig. 6, screw 86 is tightened to maintain the reservoir 68 in an operative position. As the head 76 is dropped into collar 84, a fixture 88 on rod 70 is brought into engagement with a band 90 circumscribing the upper portion of the reservoir 68. Thus, replacing the reservoirs 68 is rendered easy and possible by merely opening door 26 and lifting the reservoirs 68 after screw 86 has been loosened.

Sliding valve 92 mounted upon the lowermost face of partition 60 controls the passage of ingredient from each reservoir 68 respectively, as slide 78 is shifted to the open position, as viewed at the left in Fig. 6. A small detent 94 on slide 78 yieldably maintains the slide in the closed position. This detent 94 comprises not only the portion shown in the edge of the slide 78 as illustrated in Fig. 11, but a conventional spring loaded ball confined within head 76 and below screw 96.

Figure 9:
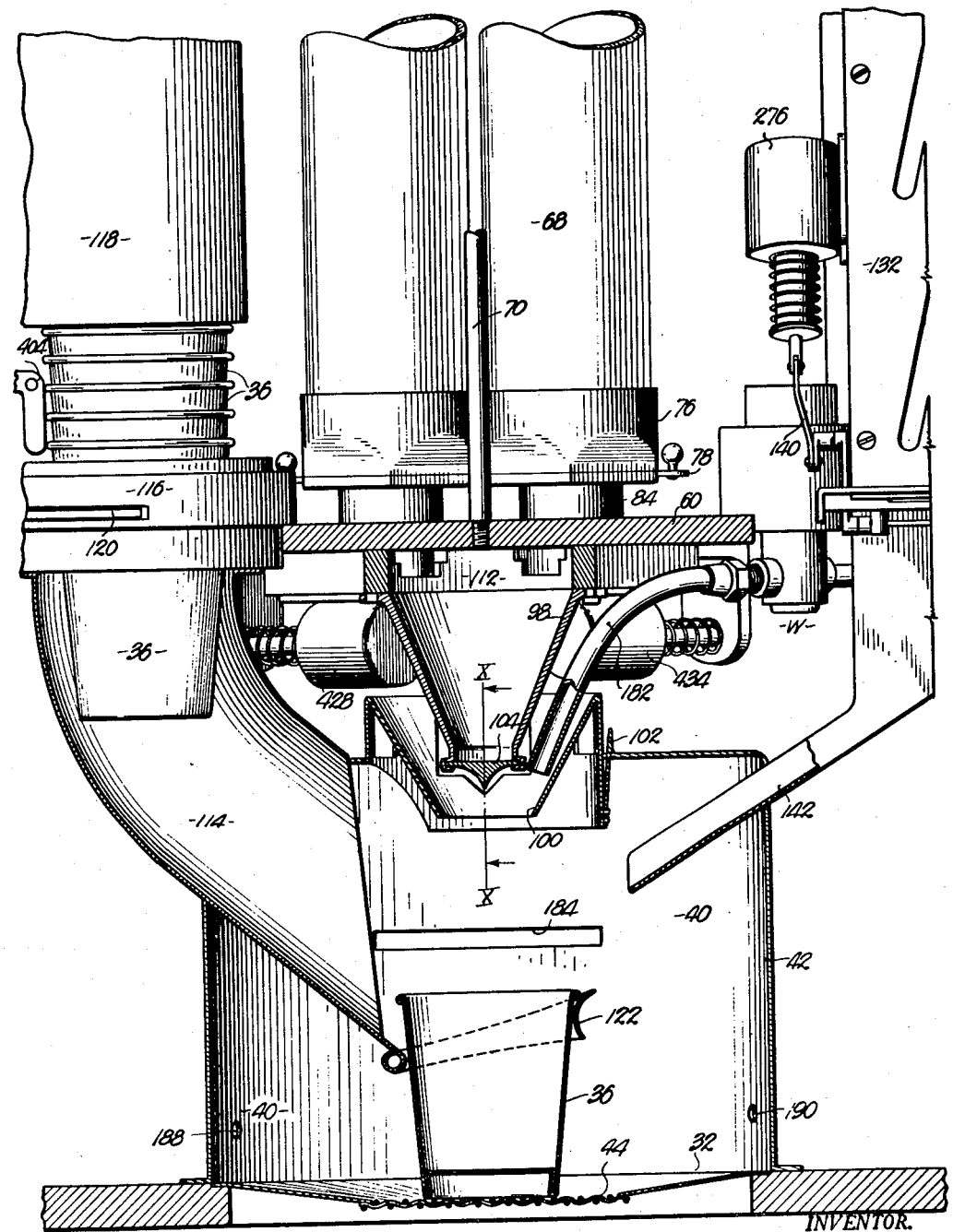
Fig. 9 is an enlarged fragmentary sectional view taken on line IX—IX of Fig. 4.

Each of the four reservoirs 68 illustrated in the form of invention chosen for description, contains a different ingredient which is fed into structure for directing the ingredients from the reservoirs 68, and hot liquid from the hereinafter described boiler into container 36. This structure is clearly illustrated in Fig. 9 and includes a depending, frusto-conical member 98 and a similar element 100. The latter element is mounted upon the uppermost wall forming decoction chamber 40, through the medium of spring fingers 102, the flexing whereof will permit easy removal of element 100 for cleaning. Member 98 has a gate 104 movable to and from a closed position by solenoid 290 in a manner to be more fully hereinafter described.

Figure 21:
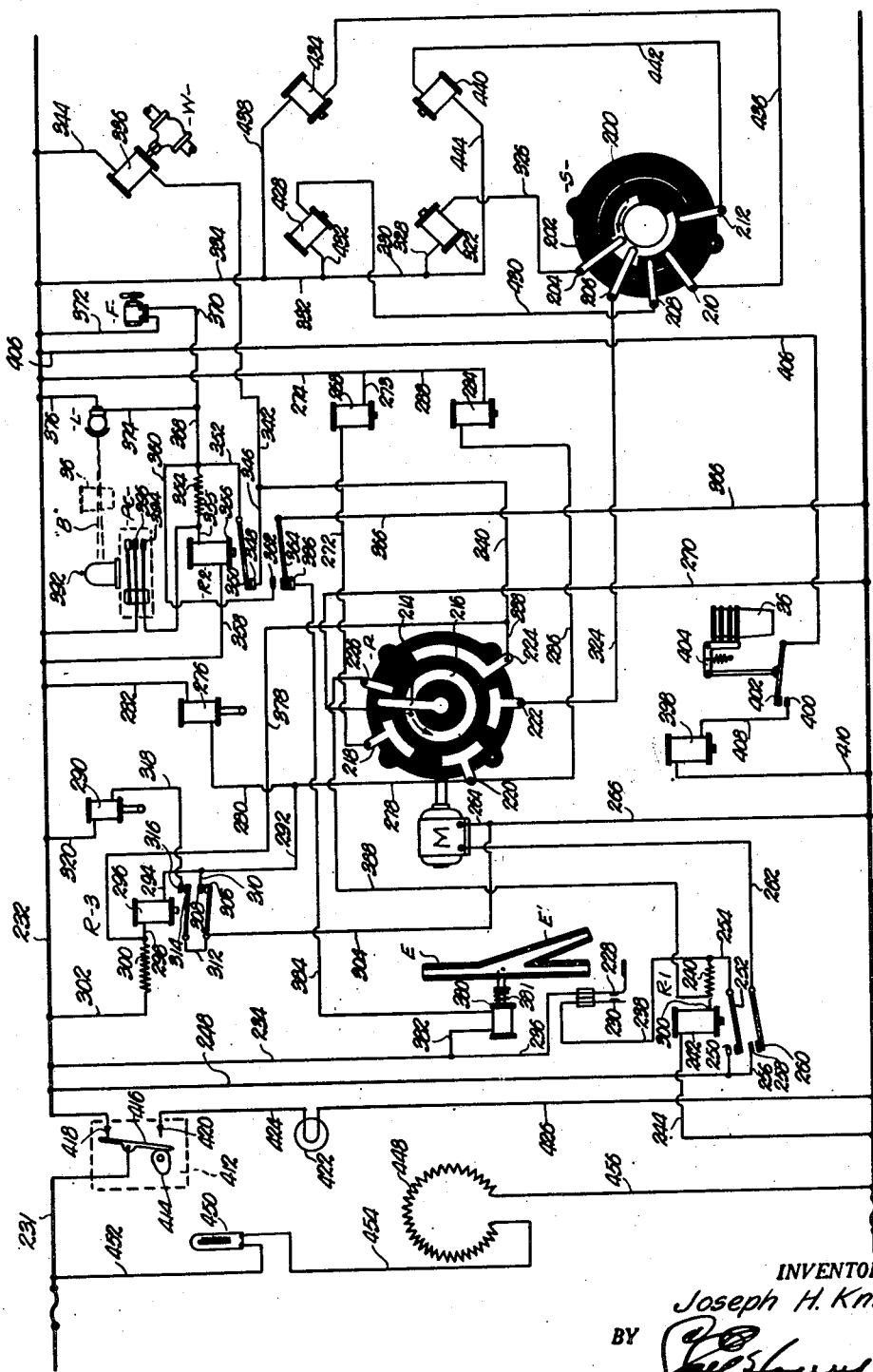
Fig. 21 is a schematic wiring diagram illustrating the electrical apparatus constituting a portion of the drink maker and vending machine.

Each valve 92 is operably associated with a solenoid in the electrical circuit illustrated in Fig. 21. Solenoid 322 controls valve 92 to feed coffee through member 98 when the valve is in that position illustrated in Fig. 6. Solenoid 434 is operably associated with the valve 92 of the reservoir 68 which contains sugar. Solenoid 428 is joined to valve 92 controlling the passage of cream from reservoir 68, and solenoid 440 is operably joined to valve 92 controlling the passage of chocolate from a reservoir 68.

Figure 8:
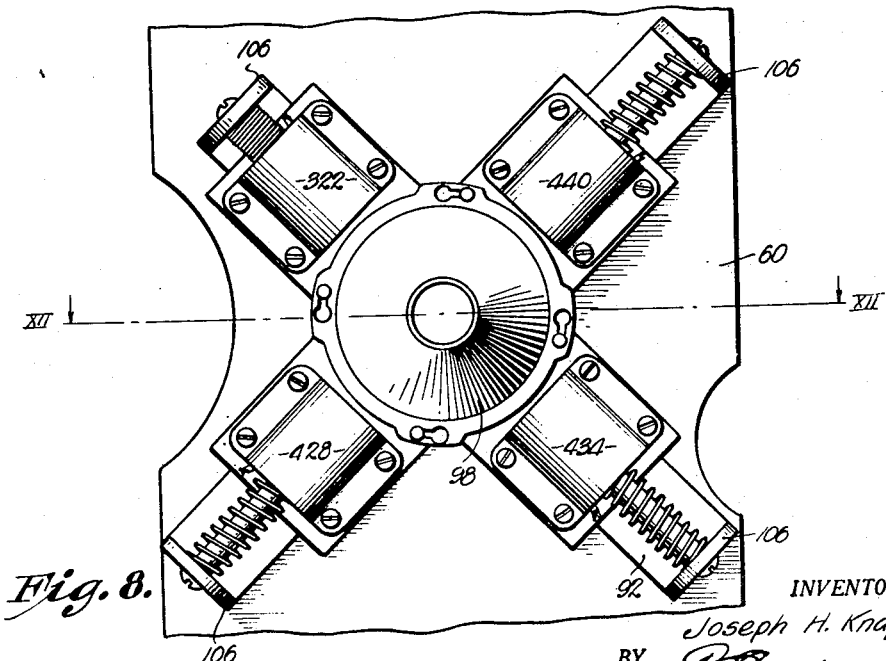
Fig. 8 is a bottom plan view of the operating apparatus for the valves in the outlet ports of the ingredient reservoirs.

Each valve 92 is radially disposed as illustrated in Fig. 8, and is substantially L-shaped to provide a lug 106 to which is attached one end of the reciprocating core of the aforesaid associated solenoids. The conventional coil spring wound around each core yieldably maintains the associated valve 92 in the closed position when the respective solenoids are not energized.

A stop 108 rides in slot 110 in one leg of the L-shaped valve 92 and the apertured end of valve 92 is closed by yoke 112 positioned as clearly illustrated in Figs. 6 and 12. The aperture in valve 92 is, of course, of a size to feed a charge of ingredient of suitable volume and when the ingredients are powdered, the aperture in valve 92 becomes a measure for the ingredient fed. When the ingredient is formed as hereinafter to be more fully set forth and as shown in Figs. 22 and 23, the aperture in valve 92 need be only large enough to receive the ingredient units.

Figure 3:
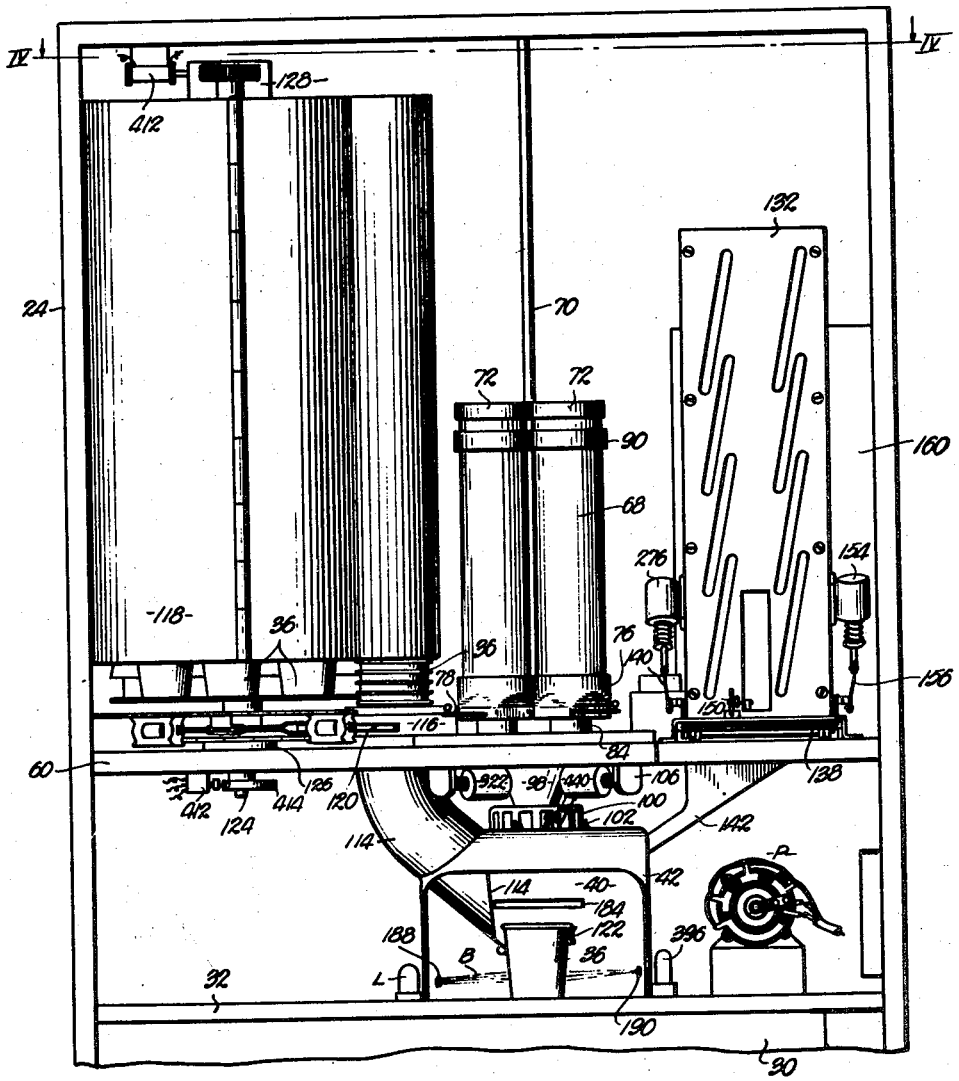
Fig. 3 is a front elevational view of the upper portion of the drink making machine, with the front wall removed.
Figure 10:
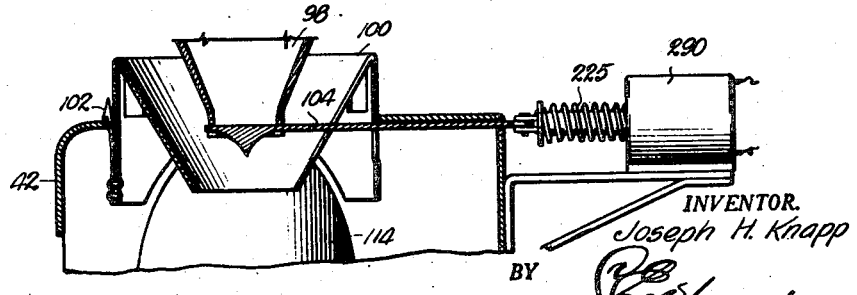
Fig. 10 is a detailed fragmentary sectional view taken on line X—X of Fig. 9.
Figure 7:
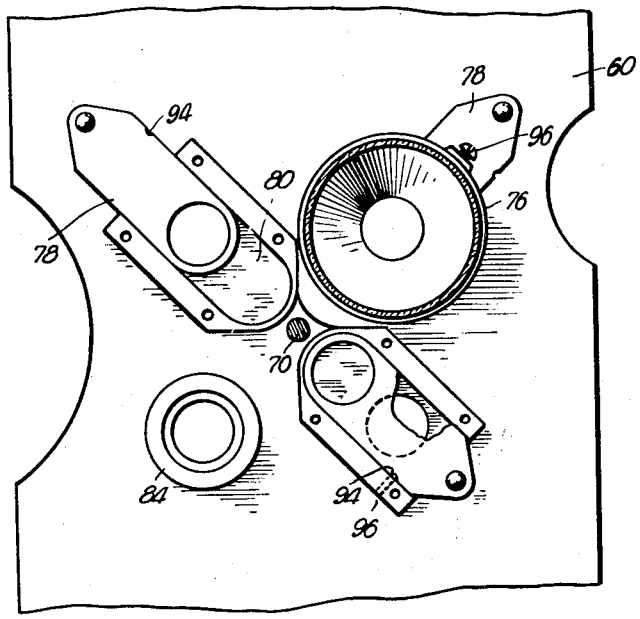
Fig. 7 is a detailed fragmentary sectional view taken on substantially the irregular horizontal line VII—VII of Fig. 6.

Member 98 and element 100 are in alignment with container 36 when it rests upon the foraminous area 44 of partition 32 that forms the floor for the decoction chamber 40. Container 36 reaches the position illustrated in Figs. 3 and 9 through a chute 114 entering chamber 40 from the container feeding unit 116 of container magazine 118. This container feeding unit is of conventional character in that containers 36 are fed one at a time in response to the movement of lever 120 in one direction. Solenoid 268 operably connected to lever 120 will shift the lever to the container feeding position when the said solenoid is energized and solenoid 284 will withdraw lever 120 to the "set" position when that solenoid is energized in a manner more fully described herein when referring to the wiring diagram illustrated in Fig. 21. Bracket 122 insures that container 36 will remain in an upright condition after it has been fed through chute 114.

Container magazine 118 is of the conventional type, obtainable on the open market, and includes a number of stacks of containers 36 arranged in an annular path about the vertical axis of the magazine 118, whereon is disposed shaft 124. A clock-type spring 126 is wound around shaft 124, has one end anchored thereto, while the other end is secured to a stationary part of the machine such as partition 60. This spring 126 exerts force upon shaft 124 to urge magazine 118 around the axis thereof to successively position the stacks of containers 36 over the upper end of chute 114 where the containers will drop into unit 116 to be fed one at a time. As containers 36 in each stack respectively, are fed through chute 114 and the stack depleted, trigger 404 will move about its pivotal support to close the circuit through contacts 400 and 402. When this condition is established, the next succeeding stacks of containers 36 will be moved to a position above unit 116 by solenoid 398 having connection to shaft 124 through conventional escapement mechanism 128, to allow spring 126 to function as above set down.

A cam 414 on shaft 124 actuates switch 412 when no more containers 36 are available, and under such conditions as will be more fully described when referring to the electrical diagram in Fig. 21, lamp 422 will burn behind a window 130 to display the words "sold out." At this juncture, coin chute E will be blocked to return any deposited coin, token or similar article, back to the customer. Lamp 422 will illuminate the "sold out" sign and the proprietor of the equipment can immediately refill the magazine 118 with containers 36.

Stirring implements are automatically dropped into container 36 as the machine passes through one complete cycle. Flat wooden spoons that may be stacked in a magazine 132 have been found advantageous and because of the space occupied, magazine 132 is made to present a pair of compartments 134 wherein the stirring implements 136 are stored for use one at a time. Solenoid 276 feeds implements 136 from compartment 134 as it is energized to draw slide 138 from the position shown in Fig. 17. Solenoid 276 is joined to slide 138 by suitable linkage, generally designated by the numeral 140, and upon energization of solenoid 276, slide 138 will be shifted inwardly to position an implement 136 into chute 142 leading into decoction chamber 40. Slot 144 communicates with chute 142 and is long enough to receive implements 136. As they travel downwardly through chute 142, one end will enter container 36 and the implement will assume an upright position therein.

A follower block 146 having a groove 148 therein will permit spring loaded arm 150 to close switch 152 when the implements 136 in one compartment 134 have all been fed therefrom. This switch 152 is electrically connected to solenoid 276 and when operated, will remove solenoid 276 from the implement feeding circuit and substitute solenoid 154 therefor. This solenoid 154 is joined by suitable linkage 156 to slide 158 controlling the feeding of implements 136 from the compartment in the magazine 132 opposite to the compartment having the follower block 146 therein. The number of implements 136 is substantially greater than the number of containers 36, and therefore, when the supply of containers 36 is replenished a re-loading of magazine 132 may occur, to the end that an adequate supply of implements 136 will always be available.

The compartments 134 within magazine 132 are formed substantially as shown in Fig. 14, and to conform in cross sectional contour to the areas of the stirring implements that are used. The feeding of these implements 136 occurs immediately after a container 36 has been deposited in decoction chamber 40 and before any ingredients or hot liquid is released.

The means for introducing hot liquid into container 36, must be capable of supplying a substantially constant flow of hot water or other liquid, from which the drinks are made and that comprises the vehicle for the ingredients without attention from the operator.

The liquid boiler H is positioned in case 24 at a place shown clearly in Fig. 4. The boiler has an outer tank 160 within which is an inner tank 162 provided with a tubular, perforated riser 164 located on the axis of inner tank 162. A transverse partition 166 near the bottom of inner tank 162, sets off a chamber 168 into which the liquid entering the boiler through pipe 170 first passes in its cycle of flow through the heating equipment.

Pipe 170 is connected to any suitable source of supply, such, for instance, as the city water system or the said pipe 170 may be joined to a tank of liquid mounted within case 24 or at any point accessible.

Heating element 448 underlies that portion of the bottom of outer tank 160 which floors chamber 168. The heating element 448 is held in the operative position by clamp 172 anchored by bolt 174. A sheet of insulating material 176 prevents heat loss.

A series of tubes 178 extend downwardly from partition 166 to points within the annular channel provided in the floor of chamber 168. This channel is near the wall of inner tank 162, as illustrated in Fig. 18. A baffle wing 180 overlies the open end of pipe 170. Outlet or feed pipe 182 communicates with the uppermost part of inner tank 162 and extends downwardly through the space between inner and outer tank 162 and 160 respectively, and directly to valve W controlled by solenoid 336. From valve W pipe 182 extends to a point within element 100, as clearly shown in Fig. 9.

A thermostat 450 mounted within chamber 168 maintains the temperature of the liquid in chamber 168 within a range suitable for efficient operation of the machine. This thermostat 450 controls the flow of current to heating element 448 through wires 452, 456 and 454.

A liquid boiler made as just illustrated and described, is capable of supplying water for the production of hot coffee or hot chocolate as fast as the machine is commercially operated, and when the hot liquid passes into container 36 through pipe 182, the steam arising is handled to not only protect the overlying parts of the machine, but to evacuate decoction chamber 40 and thereby prevent condensation.

Fan F is mounted within case 24 where the reservoirs for the ingredients are disposed. Since it has been found practicable to use powdered ingredients, any moisture that may collect in case 24 would be objectionable, and therefore, such steam as is generated in chamber 40 should be blown therefrom. Slot 184 formed in the wall of chamber 40 is in communication with a conduit 186 operably associated with fan F, as illustrated in Fig. 5. A squirrel cage type fan may be preferable, and therefore, the fan F shown may be altered to suit conditions.

Fan F is in case 24, and therefore, such air as is blown through conduit 186 will be evacuated from this case to establish adequate ventilation. The blast of air directed through slot 184 will waft the rising steam forwardly and into the space in front of the vending machine, where the operator is usually standing. This action will allow the operator to detect the odor of the drink as it is being made and before the container 36 is actually removed from the decoction chamber 40.

Gate 104 will open just before the ingredients are fed through member 98 and will close after they have been dropped. The closing of this gate 104 is therefore, prior to the introduction of hot liquid into container 36—therefore, no rising steam will enter member 98 even in the absence of the blast of air which is created through slot 184.

The container 36 having the drink therein, rests upon the floor of chamber 40 and between windows 188 and 190 adjacent to which are disposed exciting lamp L and photoelectric cell 392. A beam of light from lamp L to cell 392 is broken by the presence of container 36 when it rests in the position shown in Fig. 9. This beam will be completed when container 36 with the prepared drink is removed by the customer or operator of the equipment. The photoelectric cell assembly PC will then come into play as hereinafter set down, to break the circuit to fan F and extinguish lamp L. The fan circuit and the light circuit were closed as hot liquid was passed through pipe 182 by virtue of the opening of valve W.

The ingredient reservoirs illustrated in Figs. 22 and 23, are made in accordance with a modified form of the invention. This reservoir 600 carries a spirally arranged ramp 602 mounted on shaft 604. The ingredient units 606 are powdered and compressed, having a coating of soluble substance thereover to maintain the unitary condition and to prevent deterioration. These units are fed one at a time through the valves 92 of the outlet ports, and the entire unit is soluble in the liquid passing from the boiler H to container 36.

The temperature of the liquid in the boiler H is maintained at a point where it will dissolve the units 606 by thermostat 450. The temperature of the liquid emanating from boiler H should always be great enough to quickly dissolve the ingredients forming a part of the drink.

In the normal operation of the machine, a coin, token or the like, is introduced through coin chute E after pointer 50 has been moved to the area having the description thereof of the drink desired. A container 36 will assume the position shown in Fig. 3, after which a stirring implement 136 will drop thereinto through chute 142. Gate 104 will next be shifted to the open position to allow the passage of the ingredients from reservoir 68 through member 98 and into container 36. Gate 104 will be closed as hot liquid passes through pipe 182. Simultaneously with these last two steps in the sequence of mechanical operations, fan F will commence its function of evacuating case 24 and directing a blast of air through slot 184. When the operator removes the filled container 36, the fan will stop, and lamp L will be extinguished, whereupon the machine is in condition for reseting.

The sequence of mechanical operations just above described, are accompanied by electrical operations in addition to those mentioned. All of these electrical actions of the machine may be understood by reference to Fig. 21, schematically illustrating the electrical circuit forming a part of the equipment.

The manually operable switch S comprises a movable contact plate 200 arcuate in form and provided with a salient 202 of segmental form and of such width as to span the distance between certain of the radially disposed contact fingers 204, 206, 208, 210 and 212. The length of contact fingers 204 and 206 is such as to have their inner ends ride over the arcuate contact plate 200, and the length of contact fingers 208, 210 and 212 is such as to cause the same to be engageable only by the salient 202, integral with contact plate 200.

Program switch P is controlled by motor M and it is this switch that closes appropriate circuits to feed the containers 36, stirring implements 136, the ingredients from the aforesaid reservoirs 68, and the hot water through valve W from the hereinabove described boiler H. Sweep arm 214 is driven by motor M and is formed of conducting material to join annular, continuous contact plate 216 and contact segments 218, 220, 222, 224 and 226.

The machine is constructed to operate from commercial power lines by being plugged into a conventional outlet, not here shown. When so connected, solenoid 380 is energized to open chute E. The circuit energizing this solenoid 380 is traced as follows:

From power line 232 through wires 234 and 382, solenoid 380, wire 384, and normally closed contacts 386 and 364, and wire 366 to power line 246.

Assume now that the machine is set to prepare and make ready for consumption by the customer, a cup of coffee without cream or sugar, but, as is always the case, with a stirring implement 136 in a container 36. Switch S is set as shown in the wiring diagram and a coin is dropped through chute E to momentarily bring together contacts 228 and 230. When such occurs, a circuit is closed to drop a container 36, after which the machine continues to automatically operate until a cycle has been completed. Relay R—1 must first be closed and the circuit for accomplishing this act is traced as follows:

From power line 232 through wires 234 and 236, contacts 228 and 230, wire 238, resistor 240, coil 242 of relay R—1, and wire 244 to power line 246.

With relay R—1 thus closed, motor M will operate to move sweep arm 214 from the point where it came to rest at the end of the last cycle of operation, in the direction of the arrow. Relay R—1 is "sealed-in" or closed to insure energization of its coil through the following circuit:

From power line 232 through wire 248, closed contacts 250 and 252 of relay R—1, wire 254, resistor 240, coil 242, and wire 244 to power line 246.

The motor circuit is closed to actuate motor M through relay R—1, and this motor circuit is traced as follows:

From power line 232 through wires 248 and 256, closed contacts 258 and 260, wire 262, motor M, wires 264 and 266 to power line 246. The motor M will continue to rotate so long as contacts 258 and 260 are closed. Motor M stops when sweep arm 214 reaches segment 226 causing de-energization of relay R—1. When sweep arm 214 leaves segment 218, solenoid 268 is de-energized.

Now that motor M has started, sweep arm 214 will travel in the direction of the arrow to interconnect contact segment 218 with plate 216 and thereby energize solenoid 268 for the purpose of feeding a cup from the magazine 118 thereof. The circuit for energizing solenoid 268 is closed as follows:

From power line 246 through wire 270, plate 216, sweep arm 214, segment 218, wire 272, solenoid 268, wires 273 and 274 to power line 232.

A container 36 having been dropped, sweep arm 214 travels to contact segment 220 where a circuit is closed to feed a stirring implement 136 and another circuit is closed to withdraw the feeding arm of magazine 118. The steam deflecting gate 104 is also moved to an open position at this juncture. The circuit for energizing solenoid 276 to drop a stirring implement 136, is closed as follows:

From power line 246 through wire 270, plate 216, sweep arm 214, segment 220, wires 278 and 280, solenoid 276, and wire 282 to power line 232.

Simultaneously with the dropping of stirring implement 136, arm 120 of magazine 118 is withdrawn to the normal position or "set" point by energizing solenoid 284 through the following circuit:

From power line 246, wire 270, plate 216, sweep arm 214, segment 220, wire 286, solenoid 284, wires 288 and 274 to power line 232.

The gate 104 is opened at this juncture by energizing solenoid 290, the circuit for which is through relay R—3, and therefore, this relay must first have its points closed and be sealed-in before solenoid 290 can be energized. The circuit closing relay R—3 is traced as follows:

From power line 246 through wire 270, plate 216, sweep arm 214, segment 220, wires 278, 292 and 294, coil 296, wire 298, resistor 300, and wire 302 to power line 232.

Relay R—3 is sealed-in through the following circuit:

From power line 246, wires 266 and 304, closed contacts 306 and 308, wires 310 and 294, coil 296, wire 298, resistor 300, wire 302 to power line 232. Contacts 306 and 208 will also maintain solenoids 276 and 284 in the energized condition until sweep arm 214 strikes segment 204.

Now that relay R—3 has been closed and sealed-in, solenoid 290 is energized to open gate 104 through the following circuit:

From power line 246, wires 266, 304 and 312, closed contacts 314 and 316, wire 318, solenoid 290, and wire 320 to power line 232.

Thus, the circuit just completed, will open the gate to permit the ingredients to pass from reservoirs 68 and into the dropped container 36. This gate remains open until hot water starts to pour into container 36 through feed pipe 182.

As the movement of sweep arm 214 continues to engage contact segment 222, a measured quantity of coffee or a coffee unit is dropped into the previously deposited container 36, solenoid 32 actuates sliding valve 92 to feed a quantity of coffee, and the circuit to energize this solenoid is closed as follows:

From power line 246 through wire 270, plate 216, sweep arm 214, segment 222, wire 324, finger 206, salient 202, finger 204, wire 326, solenoid 322, and wires 328, 330, 332 and 334 to power line 232.

The closing of this circuit feeds a charge of coffee into container 36 from reservoir 68 or 600, as the case may be, and the continuous movement of sweep arm 214 carries the same to contact segment 224, whereupon hot water is caused to pour into container 36, gate 104 is closed, lamp L of photoelectric assembly PC is caused to burn, and fan F is started.

Assuming now that the sweep arm 214 has touched segment 224, the circuit energizing solenoid 336 to open valve W and feed a charge of hot liquid into the deposited container 36 is closed as follows:

From power line 246 through wire 270, plate 216, sweep arm 214, segment 224, wires 338, 340 and 342, solenoid 336, and wire 344 to power line 232.

To close the circuits feeding lamp L and fan F, relay R—2 is closed and sealed-in. The circuit for closing relay R—2 is as follows:

From power line 246 through wire 270, plate 216, sweep arm 214, segment 224, wires 338, 340 and 346, contacts 348 and 350, wire 352, resistor 354, wire 355, coil 356 of relay R—2, and wire 358 to power line 232.

This relay R—2 is sealed-in through the following circuit:

From power line 232 through wire 358, coil 356, wire 355, resistor 354, wire 360, contacts 362 and 364, and wire 366 to power line 246.

Now that relay R—2 has been sealed-in, the circuit to start the motor of fan F is continued immediately. The fan circuit which is closed to cause fan F to continue its operation, is traced as follows:

From power line 246 through wire 366, closed contacts 364 and 362, wire 360, 368 and 370, fan F, and wire 372 to power line 232.

The exciting lamp L is caused to continue to burn through the following circuit:

From power line 246 through wire 366, closed contacts 364 and 362, wires 360, 368 and 374, lamp L, and wire 376 to power line 232.

As sweep arm 214 first comes into engagement with segment 224, relay R—3 is de-energized to open its contacts 314 and 316. This de-energization of relay R—3 occurs to de-energize solenoid 290, allowing spring 225 to re-close gate 104 through the following circuit:

From power line 246 through wire 270, plate 216, sweep arm 214, segment 224, wires 338, 378 and 298, coil 296, wires 294 and 310, closed contacts 308 and 306, and wires 306 and 266 to power line 246.

Simultaneously, solenoids 276 and 284 are de-energized to allow their return to normal position. At the same time that the actions just described occur and as sweep arm 214 is on segment 224, solenoid 380 is de-energized to close coin chute E and cause the return of any deposited coin or the like, if such should be dropped. This de-energization allows spring 381 to move the bar of solenoid 380 to a position shown in dotted lines of Fig. 21. Solenoid 380 is energized as above set forth, throughout the time the machine is connected to a source of supply, excepting when a "sold out" condition prevails as hereinafter described, and from the time hot liquid starts entering the container 36 until the container is removed from its place in decoction chamber 40.

Solenoid 380 is de-energized when the machine is disconnected from a source of supply, and, therefore, spring 381 will cause the plunger of solenoid 380 to move to a position where coins are routed out through chute E'. Solenoid 380 is de-energized as sweep arm 214 strikes segment 224, causing relay R—2 to be energized, thereby opening contacts 364 and 386 and breaking the circuit to de-energize solenoid 380.

When sweep arm 214 leaves segment 224, solenoid 336 controlling liquid valve W, is de-energized. The amount of liquid poured into container 36 is therefore, determined by the length of segment 224 and speed of program switch P.

The pouring of hot liquid into container 36 will not be detrimental to the overlying parts of the machine because steam cannot pass beyond gate 104, all as above clearly set down.

The continued movement of sweep arm 214 draws the same into contact with segment 226, whereupon relay R—1 is de-energized to open contacts 258 and 260 of relay R—1. This de-energization of relay R—1 occurs through the following circuit:

From power line 246 through wire 270, plate 216, sweep arm 214, segment 226, wires 388 and 390, coil 242, and wire 244 to power line 246.

When contacts 258 and 260 are opened by de-energizing relay R—1, the circuit to motor M is broken to discontinue its operation and cause program switch P to come to rest with sweep arm 214 between segments 218 and 226.

When the customer removes filled container 36 from its position in decoction chamber 40, beam B is completed. This beam is directed from lamp L to photoelectric cell 392 of photoelectric cell assembly PC. Such assembly is of conventional type, obtainable on the open market, and has a single pole relay with contacts 394 and 396 normally open. When beam B is completed, points 394 and 396 are closed to complete a circuit for the performance of de-energizing relay R—2. This de-energization opens contacts 362 and 364 to break the circuit for fan F and lamp L at the same time contacts 364 and 386 re-close, causing re-energization of solenoid 380 to open coin chute E to receive another coin, token or the like, not here shown.

Photoelectric cell 392 of assembly PC receives current so long as the machine is connected to a source of supply. The conventional lines from assembly PC are connected to power lines 232 and 246 in any desired manner.

Solenoid 398 is used to move magazine 118 step-by-step as the stacks of containers 36 are depleted. Current is supplied to this solenoid 398 through a switch having contacts 400 and 402. This switch is operated by lever 404, held in the open position by containers 36 in the stacks when they are in the position to feed containers through chute 114. When a stack of containers 36 is depleted and trigger 404 actuates contacts 400 and 402 to a closed condition, solenoid 398 is energized through the following circuit:

From power line 232, wire 406, closed contacts 402 and 400, wire 408, solenoid 398, and wire 410 to power line 246. When a new stack of containers 36 appears, contacts 402 and 400 will again be opened.

Main switch 412 is operated by cam 414 when the cup magazine 118 has completed one revolution to empty all stacks therein. This cam, therefore, opens contacts 416 and 418 and closes contacts 416 and 420 to de-energize power line 232 and light "sold out" lamp 422 respectively. Note that such breaking of line 232 from its source of power de-energizes solenoid 380 and a coin will be returned through chute E' if it is dropped into chute E. The circuit for lamp 422 is traced as follows, when contacts 416 and 420 are closed:

From power line 231 (being a section of power line 232 which has not been de-energized), closed contacts 416 and 420, wire 424, lamp 422, and wire 426 to power line 246.

Heater element 448 of boiler H is also in that portion of the circuit allowing current to pass to element 448 which is controlled by thermostat 450. The heater circuit is as follows:

From power line 231 through wire 252, thermostat 450, wire 454, element 448, and wire 456 to power line 246.

Magazine 118 must be refilled with containers 36 to actuate switch 412 and as the magazine is refilled, it is turned about its axis to operate cam 414 to a position where it releases contact 416 from contact 420 and causes contact 416 to engage contact 418.

Switch S is in the position for preparing a cup of hot coffee without cream or sugar when in the condition illustrated in the wiring diagram of Fig. 21.

The description of the various circuits indicates the manner in which the necessary amount of coffee is fed from reservoir 68 and it will now be assumed that the purchaser desires to procure a cup of hot coffee having cream added thereto. Under such conditions, contact plate 200 will be moved in the direction of the arrow to the point where salient 202 will come into engagement with finger 208. With this setting, the switch S has interconnected fingers 204, 206 and 208. Solenoid 428 will then, therefore, be energized when sweep arm 214 reaches segment 222. This energization of solenoid 428 opens valve 92 controlling the flow of cream in either liquid or powedered form, from reservoir 68 thereof, at the same time that solenoid 322 is energized to feed the requisite amount of coffee. Thus, two ingredients are simultaneously fed just prior to the introduction of hot liquid, such as water, into the dropped container 36. The circuit closing solenoid 322 has previously been traced. The circuit closing solenoid 428 as sweep arm 214 is on segment 222, is as follows:

From power line 246 through wire 270, plate 216, sweep arm 214, segment 222, wire 324, finger 206, salient 202, finger 208, wire 430, solenoid 428, and wires 432, 332 and 334 to power line 232.

Assuming now that the purchaser is desirous of obtaining a cup of hot coffee having both cream and sugar therein. Plate 200 with its integral salient 202 will be moved a step further in the direction of the arrow, to cause salient 202 to contact finger 210 as well as fingers 208, 206 and 204. Again when sweep arm 214 reaches segment 222 for the purpose of dropping the constituents of the drink from reservoirs 68, solenoid 436 will be energized to feed a quantity of sugar at the same time the coffee and cream are deposited in container 36. The circuit closing solenoid 434 is as follows:

From power line 246, wire 270, plate 216, sweep arm 214, segment 222, wire 324, finger 206, plate 200, salient 202, finger 210, wire 436, solenoid 434, and wires 438 and 334 to power line 232.

If the customer desires a cup of coffee with sugar therein and without cream, contact 200 is moved still further in the direction of the arrow and to a point where finger 210 will be engaged by salient 202 and fingers 204 and 206 will be engaged by contact 200—thus, the finger 208 which supplies cream is not engaged in anywise by either contact 200 or 202. Under such conditions, solenoid 434 and solenoid 322 will be simultaneously energized to feed sugar and coffee respectively. Circuits to both solenoid 434 and solenoid 322 have been traced above.

An additional hot drink may be obtained by further manipulating switch S to the extent of moving contact 200 around in the direction of the arrow to a point where salient 202 engages finger 212. When in this condition, finger 206 is engaged by plate 200 but finger 204 is between the ends thereof and not in contact therewith. Likewise, fingers 208 and 210 are not in engagement with salient 202. With the connection thus made by the operator, solenoid 440 is energized to feed a quantity of chocolate into the dropped container 36 when sweep arm 214 reaches contact plate 22. The circuit closing solenoid 440 is traced as follows:

From power line 246 through wire 270, plate 216, sweep arm 214, segment 222, wire 324, finger 206, contact plate 200, salient 202, finger 212, wire 442, solenoid 440, and wires 444, 330, 332 and 334 to power line 232.

Contact plate 200 is moved with respect to fingers 204 to 212 inclusive, by grasping knob 48 to cause point 50 to sweep over areas 52, 54, 56, 57 and 58, all of which have indicia thereon for the purpose of clarifying to the operator the exact type of drink which will be produced when the coin is dropped.

Having thus described the invention, what is claimed as new and desired to be secured by Letters Patent is:

1. In a hot drink making machine of the character described, a plurality of reservoirs for drink ingredients; a dispensing mechanism for each reservoir respectively; an electrically operable actuating element for each dispensing mechanism respectively; a selector switching device having a plurality of fixed contacts, each being electrically connected to a respective one of said actuating elements, and a manually manipulable contact plate engageable with each of said contacts or two or more simultaneously; a supply circuit having said fixed contacts and said actuating element interposed therein; and means for closing the supply circuit through said contact plate, the fixed contacts engaged thereby, and corresponding actuating elements for dispensing certain of said ingredients upon prior selection thereof by manipulation of the said contact plate.

2. In a hot drink making machine of the character described, a plurality of reservoirs for drink ingredients; a dispensing mechanism for each reservoir respectively; an electrically operable actuating element for each dispensing mechanism respectively; a selector switching device having a plurality of fixed contacts, each being electrically connected to a respective one of said actuating elements, and a manually manipulable contact plate engageable with each of said contacts or two or more simultaneously; a supply circuit having said fixed contacts and said actuating elements interposed therein; a motor driven switch for closing the supply circuit through said contact plate, the fixed contacts engaged thereby, and corresponding actuating elements for dispensing certain of said ingredients upon prior selection thereof by manipulation of the said contact plate; means including a coin receiving device for initiating energization of said motor upon reception of the coin; and means for maintaining energization of the motor independently of said coin.

3. In a hot drink making machine of the character described, a plurality of reservoirs for drink ingredients; a dispensing mechanism for each reservoir respectively; an electrically operable actuating element for each dispensing mechanism respectively; a selector switching device having a plurality of fixed contacts, each being electrically connected to a respective one of said actuating elements, and a manually manipulable contact plate engageable with each of said contacts or two or more simultaneously; a supply circuit having said fixed contacts and said actuating elements interposed therein; a motor driven switch for closing the supply circuit through said contact plate, the fixed contacts engaged thereby, and corresponding actuating elements for dispensing certain of said ingredients upon prior selection thereof by manipulation of the said contact plate; a circuit for the motor; a relay in the circuit; means including a coin receiving device for initiating energization of the relay to close the motor circuit upon reception of the coin; and a holding circuit closed by the relay to maintain the relay energized for continued operation of the motor.

4. In a hot drink making machine of the character described, a plurality of reservoirs for drink ingredients; a dispensing mechanism for each reservoir respectively; an electrically operable actuating element for each dispensing mechanism respectively; a selector switching device having a plurality of fixed contacts, each being electrically connected to a respective one of said actuating elements, and a manually manipulable contact plate engageable with each of said contacts or two or more simultaneously; a supply circuit having said fixed contacts and said actuating elements interposed therein; means for closing the supply circuit through said contact plate, the fixed contacts engaged thereby, and corresponding actuating elements for dispensing certain of said ingredients upon prior selection thereof by manipulation of the said contact plate; a boiler adapted to contain a hot liquid and having a valved outlet port; an electromagnet for actuating said valve; and a circuit therefor, said means having parts for momentarily closing said electromagnet circuit for dispensing a quantity of hot liquid during each cycle of operation of said machine.

JOSEPH H. KNAPP.

REFERENCES CITED

The following references are of record in the file of this patent:

UNITED STATES PATENTS

| Number | Name | Date |
|---|---|---|
| 1,183,557 | Hall | May 16, 1916 |
| 1,199,065 | Fritsche | Sept. 26, 1916 |
| 1,465,122 | Frick | Aug. 14, 1923 |
| 1,777,670 | Hausman | Oct. 7, 1930 |
| 1,911,151 | Halstead et al. | May 23, 1933 |
| 1,944,810 | Rogers | Jan. 23, 1934 |
| 2,029,460 | Brady | Feb. 4, 1936 |
| 2,165,959 | Christianson | July 11, 1939 |
| 2,284,880 | Nicholson | June 2, 1942 |
| 2,376,403 | Thompson | May 22, 1945 |
| 2,391,003 | Bowman | Dec. 18, 1945 |
| 2,403,470 | Tull | July 9, 1946 |
| 2,462,019 | Bowman | Feb. 15, 1949 |